Patented Jan. 5, 1932

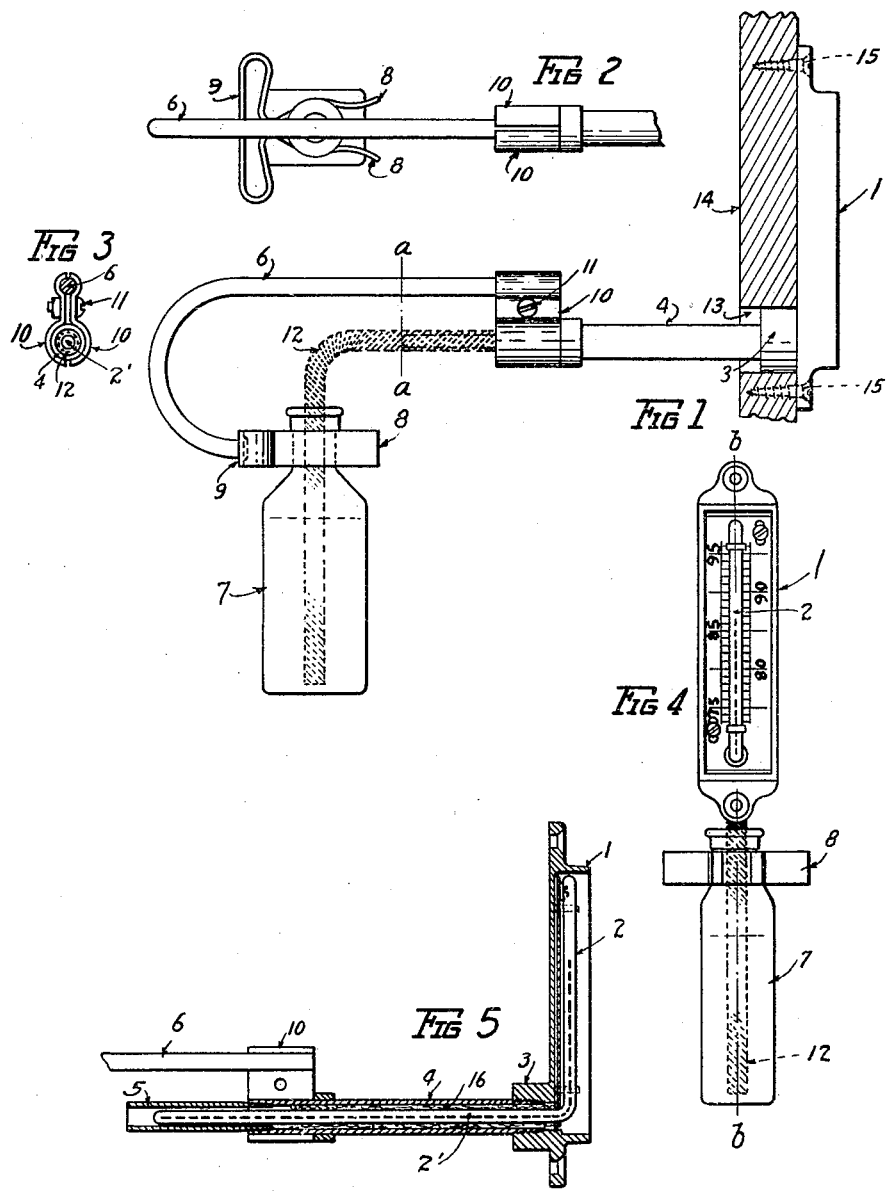

1,839,903

UNITED STATES PATENT OFFICE

LA VERNE C. STURGIS AND CHARLES E. CRAIN, OF SPRINGFIELD, OHIO, ASSIGNORS, BY MESNE ASSIGNMENTS, TO THE BUCKEYE INCUBATOR MANUFACTURING COMPANY, OF BEACHWOOD, OHIO, A CORPORATION OF OHIO

HYGROMETER

Application filed August 8, 1927, Serial No. 311,344. Renewed July 24, 1929.

This invention relates to improvements in hygrometers, it more particularly relating to a hygrometer for installation in connection with an incubator for hatching eggs. In the art of incubation, the air in the incubating chamber is maintained at a uniform degree of temperature usually 100 degrees Fahrenheit, and it is also essential to maintain a uniform degree of humidity, water being evaporated in the chamber for that purpose. In order that the proper degree of humidity may be maintained however it is necessary to indicate to the operator the percentage of moisture in the air confined in the chamber so that the amount of moisture supplied may be correspondingly regulated.

An object of our invention is to provide an instrument which can be installed in the wall of the incubating chamber which is responsive to the humidity of the air in the incubator and whose reading can be observed from the outside of the incubator.

A further and more specific object of the invention is to provide an instrument for the purpose specified embodying a thermometer of the wet bulb type which can be installed as a unit and so constructed that a moisture conveying wick may be effectively applied to the tube of the thermometer upon the inside of the incubating chamber and a reading of the tube be taken from the outside of the incubating chamber; a further object being to incorporate as a part of the instrument a supporting bracket for a water container.

A further object of the invention is to provide an instrument of the character described which has the tube formed with a comparatively long wick receiving portion for furnishing greater accuracy by providing a relatively larger surface for evaporation, and to also furnish a more convenient way of attaching the wick to the bulb and for readily reversing the end-to-end position of the wick relatively to the bulb and water container.

A further object of the invention is to provide for so supporting the water container as to eliminate interference with the currents of air flowing over the bulb to thereby insure a sufficient velocity of air over the bulb to secure the necessary evaporation to indicate accurately the humidity.

In the accompanying drawings:

Fig. 1 is a side elevation of an instrument embodying our improvements shown attached to the wall of an incubator, a portion of which is shown in section.

Fig. 2 is a plan view of a portion of the same.

Fig. 3 is a section on the line $a$—$a$ of Fig. 1.

Fig. 4 is a front elevation.

Fig. 5 is a section on the line $b$—$b$ of Fig. 4.

Referring to the drawings, 1 represents a support for a thermometer tube which is indicated at 2, the tube having a bent portion 2' projected preferably at right-angles thereto through an interiorly threaded boss 3 formed integral with the lower portion of the rear wall of the support 1. A tubular member 4 is screwed into this boss and surrounds the greater portion of the bent portion 2' of the tube so as to form a protector for the same, the outer end of this tubular member being interiorly threaded to receive a cap 5 which is used to protect the extreme outer end of the portion 2' during shipment, the cap being removed when the instrument is installed.

A bracket 6 is provided to support a small container 7 for water, this container being in the form of a bottle the neck of which is inserted between a pair of spring fingers 8 connected by an intermediate portion 9 which is secured to one end of the bracket. The other end of the bracket is secured between the members of a two-part clamp 10, which also embrace the inner end of the tube 4, a screw 11 being employed to secure these clamping members firmly to the tubular member and bracket. The water container has a tubular wick 12 which is placed upon the projecting end of the portion 2' of the thermometer tube to convey moisture thereto from the water container.

In installing the instrument an opening 13 is drilled in the wall 14 of the incubator chamber of a size to receive the boss 3 and the casing 1 is secured to the outer surface of the wall 14 by screws 15; the bracket 6 being fastened to the tube 4 after the tube has been inserted through the opening 13 and the wick slipped to position on the outer end of the portion 2' of the tube, after the cap is removed. The space between the metal tube 4 and the portion 2' is filled with material such as asbestos as indicated at 16 which acts as a cushion support and heat insulator for the thermometer tube. By this arrangement the thermometer tube is responsive to the evaporation of the moisture carried by the wick and is also responsive to the temperature of the incubating chamber. As the temperature of the chamber remains uniform at substantially 100 degrees, the degree of moisture can be ascertained by comparison with a known degree which the mercury should indicate when the proper humidity of the air in the incubator chamber is had. For instance, in practice it has been found that with a temperature of 100 degrees, if it is desired to have a humidity of 40 percent the hygrometer reading should be 80 degrees. By suitably regulating the supply of moisture therefore to the incubating chamber to maintain the hygrometer reading at 80 degrees a proper percentage of humidity can be secured.

By this arrangement, an instrument is provided which may be so installed upon an incubator that the tube will be responsive to temperature and evaporation in the incubating chamber and a reading indicating the percentage of moisture in the air in the incubating chamber be observed from the exterior of the incubator. Also, by having the thermometer tube provided with a relatively long bent portion, a relatively larger surface for evaporation is secured resulting in a more accurate device. This form of thermometer tube also eliminates the necessity of tying the wick above and below the bulb, as with a bulb of the globular type, in order to have the proper contact between the surface of the bulb and the wick. Another feature in connection with this form of thermometer tube is that the wick may be readily removed and its position reversed; that is, the end of the wick which is formerly on the tube may be placed in the bottle and the other end on the tube so that the fluff from the chicks which accumulates on the wick will be removed. Another advantage in the arrangement of this instrument results in so positioning the water container and its bracket that there will be no interference with the vertically directed currents of air, so that a sufficient velocity of the air passing directly over the tube may be secured to provide the required degree of evaporation to indicate the true condition of humidity. In connection with this latter feature, it should be stated that in the drawing the parts are positioned for upwardly directed currents of air and that in the event the installation was made in an incubator in which the currents of air are downwardly directed, the bracket would be attached to the tube 4 so as to be beneath the same by having those portions of the clamping member 10 which embrace the bracket extended downwardly instead of upwardly as in the drawings, the bracket being so applied to the clamping member that the spring arms 8 are at a lower elevation than the horizontal portion of the bracket.

Having thus described our invention, we claim:

1. In an instrument of the character described, a thermometer tube having a bent portion, and means for supporting the tube on the outer side of the wall of a structure with the bent portion extending through the wall so as to be located on the inner side thereof and arranged to receive a moisture conveyer extending from a water container, the space about a part at least of said bent portion being unobstructed whereby said bent portion may be located in the direct path of air currents in said structure.

2. In an instrument of the character described, a thermometer tube having an angularly-projecting portion, and means for supporting the tube on the outer side of the wall of a structure with the angular portion extending through said wall and located on the inner side of said wall and having an exposed portion arranged to receive a moisture conveyer extending from a water container, the space about a part at least of said bent portion being unobstructed whereby said bent portion may be located in the direct path of air currents in said structure.

3. In an instrument of the character described, a support for a thermometer tube arranged to be positioned on the outer side of the wall of a structure, a thermometer tube mounted on said support having an elongated angularly projecting portion projecting through said wall and arranged to receive a moisture conveyer extending from a water container, the space about a part at least of said bent portion being unobstructed whereby said bent portion may be located in the direct path of air currents in said structure.

4. In an instrument of the character described, a support for a thermometer tube having a projecting boss on its rear side, said support being arranged to be positioned on the outer side of the wall of a structure with the boss fitted in an opening in said wall, a thermometer tube mounted on said support having an angularly-extending portion projecting through said boss so as to lie on the inner side of said wall, said portion being formed to receive a moisture conveyer extending from a water container.

5. In an instrument of the character described, a support for a thermometer tube arranged to be positioned on the outer side of the wall of a structure, a tubular member connected with said support and projecting through said wall to the inner side thereof, a thermometer tube carried by said support having an angularly-projecting portion housed by said tubular member, said portion being arranged to receive a moisture conveyer extending from a water container.

6. In an instrument of the character described, a support for a thermometer tube arranged to be positioned on the outer side of the wall of a structure, a tubular member connected with said support and projecting through said wall to the inner side thereof, a thermometer tube carried by said support having an angularly-projecting portion housed by said tubular member, a water container, said angularly projecting portion being arranged to receive a moisture conveyer extending from said water container, and a bracket carried by said tubular member arranged to support said water container.

7. In an instrument of the character described, a support for a thermometer tube arranged to be positioned on the outer side of the wall of a structure, a tubular member connected with said support and projecting through said wall to the inner side thereof, a water container supported by said member, a thermometer tube carried by said support having an angularly-projecting portion housed by said tubular member, said portion being arranged to receive a moisture conveyer extending from said water container, and a tubular wick in said water container arranged to be slipped upon the end of said bulb.

8. In an instrument of the character described, a support for a thermometer tube mounted on the outer side of a wall, a thermometer tube carried by said support, a member extending from said support through said wall, a hanger secured to said member, a water container detachably carried by said hanger, said tube having an angularly-projecting portion projecting through said wall and protected by said member, and a tubular wick sleeved on the inner end of said angularly-projecting portion and extending to said container.

9. In an instrument of the character described, a thermometer tube having an angularly-projecting portion, a support for said tube, a tubular member projecting from said support to house a portion of said angularly-projecting portion with the end thereof projecting therefrom, and a cap adapted to be removably attached to the end of said tubular member to house the projecting end of said angular portion of the tube during shipment.

10. In an instrument of the character described, a support for a thermometer tube, a tubular member extending from said support in an angular direction, a theremometer tube carried by said support having an angularly-projecting portion housed by said tubular member, a bracket together with means for detachably connecting the same to said tubular member, and means for removably suspending a water container from said bracket.

11. In an instrument of the character described, a support, a thermometer tube mounted on said support, said tube having an angularly extending portion, an extension projecting from said support to shield said angularly-extending portion, with said portion having an exposed part projecting beyond said extension, a bracket supported by said extension and extending beyond the same in line with the exposed portion of said tube, means for adjustably securing the bracket to said extension so that it may be supported either above or below said exposed portion of the bulb, and a water container removably secured to said bracket out of vertical alignment with the exposed portion of said tube.

12. In an instrument of the character described, a thermometer tube having expansible liquid therein and provided with an elongated angularly projecting bulb, a support for said tube positioned on the outer side of the wall of a structure and provided with indicia co-operating with the liquid, said bulb being extended through said wall so as to be located on the inside of the structure and arranged to receive a moisture conveyor extending from a water container in said structure, said water container being so positioned as to leave the space about said bulb unobstructed whereby the bulb is responsive to the direct action of air currents in said structure.

13. In an instrument of the character described, a thermometer tube having a projecting portion with a part thereof at least exposed, means for supporting said exposed part of said tube in a structure in a substantially horizontal position, a water container, a moisture conveyor extending from said container to the exposed part of said tube, and means for supporting said container with relation to the exposed portion of said tube such that said exposed tube part will be in the direct path of air currents in said structure.

14. In an instrument of the character described, a support attached to the wall of a structure, a thermometer tube carried by said support having a portion cooperating with indicia on said support and another portion which projects at an angle thereto, a tubular member carried by said support surrounding said angularly extending portion of said tube but leaving the end thereof exposed, a water container, a moisture conveying member extending from said water container to said exposed part of said thermometer tube, and a support connected with said tubular member for supporting said water container out of vertical alignment with the exposed part of said thermometer tube.

In testimony whereof, we have hereunto set our hands.

LA VERNE C. STURGIS.
CHARLES E. CRAIN.